(12) United States Patent
Braunwart

(10) Patent No.: US 8,255,289 B2
(45) Date of Patent: Aug. 28, 2012

(54) SYSTEM AND METHOD FOR IN-STORE SALES OF CUSTOMIZED JEWELRY ITEMS

(75) Inventor: Eric C. Braunwart, Vancouver, WA (US)

(73) Assignee: Columbia Gem House, Inc., Vancouver, WA (US)

( * ) Notice: Subject to any disclaimer, the term of this patent is extended or adjusted under 35 U.S.C. 154(b) by 874 days.

(21) Appl. No.: 11/765,998

(22) Filed: Jun. 20, 2007

(65) Prior Publication Data
US 2007/0250456 A1    Oct. 25, 2007

Related U.S. Application Data

(60) Provisional application No. 60/864,556, filed on Nov. 6, 2006.

(51) Int. Cl.
*G06Q 30/00* (2012.01)
(52) U.S. Cl. .......... 705/26.5; 705/26.1; 705/26.61; 705/346; 211/85.2
(58) Field of Classification Search .......... 705/26–27, 705/26.1–27.2, 346; 211/85.1–85.2
See application file for complete search history.

(56) References Cited

U.S. PATENT DOCUMENTS

| | | | | |
|---|---|---|---|---|
| 4,463,856 A | * | 8/1984 | Strasser | 211/163 |
| 7,225,149 B2 | * | 5/2007 | Silberstein et al. | 705/26.5 |
| 7,693,751 B2 | * | 4/2010 | Aronson | 705/26 |
| 2002/0133431 A1 | * | 9/2002 | West et al. | 705/27 |
| 2002/0184104 A1 | * | 12/2002 | Littman | 705/26 |
| 2003/0163938 A1 | * | 9/2003 | Norton | 40/493 |
| 2004/0199435 A1 | * | 10/2004 | Abrams et al. | 705/27 |
| 2005/0005637 A1 | | 1/2005 | Rapport | |
| 2005/0187831 A1 | * | 8/2005 | Gershburg et al. | 705/27 |
| 2005/0197951 A1 | * | 9/2005 | Tolkowsky | 705/37 |
| 2005/0261989 A1 | * | 11/2005 | Vadon et al. | 705/27 |
| 2006/0020524 A1 | * | 1/2006 | Yeko et al. | 705/27 |
| 2006/0047585 A1 | * | 3/2006 | Lapa et al. | 705/27 |
| 2006/0265288 A1 | * | 11/2006 | Aronson | 705/26 |
| 2007/0219960 A1 | * | 9/2007 | Vadon et al. | 707/3 |

OTHER PUBLICATIONS www.findmyrock.com. Feb. 5, 2005. [recvered from www.Archive.org].*
www.loose-gems.com. Jan. 2, 2005. [recovered from www.Archive.org].*
Printout from www.glatter.com, Jun. 4, 2003, 2 pages.
Printout from www.glatter.com, Jun. 23, 2003, 2 pages.
Printout from www.glatter.com, Aug. 31, 1999, 5 pages.

* cited by examiner

*Primary Examiner* — William Allen
(74) *Attorney, Agent, or Firm* — Marger Johnson & McCollom PC

(57) ABSTRACT

An article of jewelry having colored gemstones may be designed according to a consumer's input at a retail location. The article of jewelry may be imaged and priced at the retail location, and a commitment to purchase the article of jewelry may be obtained based on the image provided. A jewelry retailing system may include a retail location having a design center to design an article of jewelry having colored gemstones according to a consumer's input, and an imaging device such as a color printer.

15 Claims, 5 Drawing Sheets

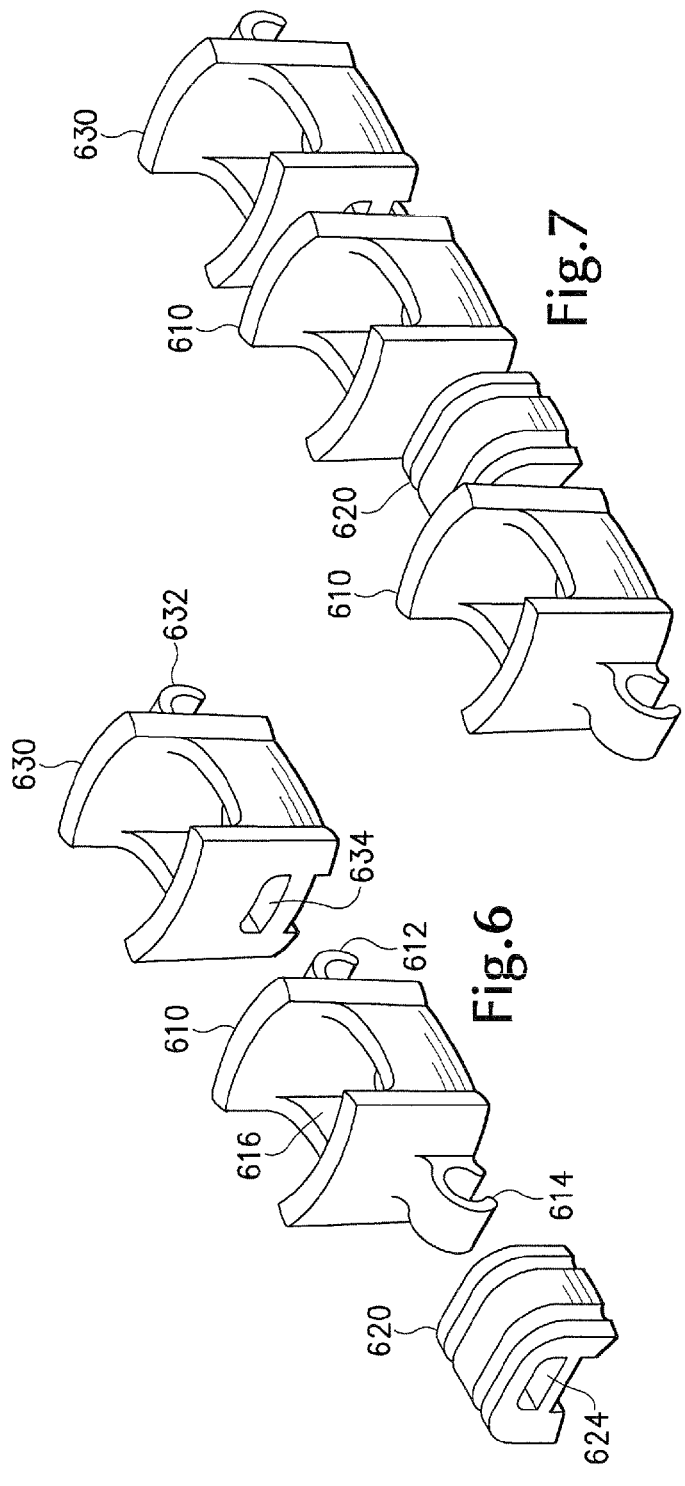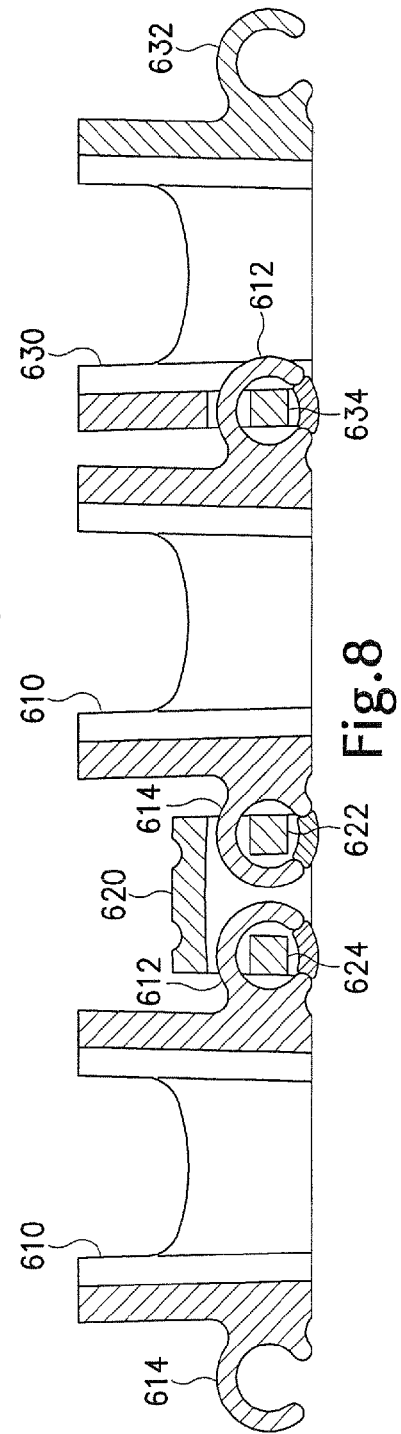

US 8,255,289 B2

SYSTEM AND METHOD FOR IN-STORE SALES OF CUSTOMIZED JEWELRY ITEMS

This application claims priority from U.S. Provisional Patent Application Ser. No. 60/864,556 filed Nov. 6, 2006 which is incorporated by reference.

BACKGROUND

Colored gemstones are becoming increasing popular in jewelry, even making inroads into articles that traditionally have only diamonds such as wedding and engagement rings. Traditional jewelry retailing techniques, however, may be problematic when adapted to jewelry that features colored gemstones. For example, the gradual shift from independent jewelry boutiques to mass merchandisers and television shopping forums has brought a need for uniformity of product. Uniformity is fairly easy to achieve with diamonds because certain characteristics such as "color" and clarity have been reduced to mathematical exactitude.

But uniformity is difficult to achieve with colored gemstones which tend to have more individualistic character. In fact, the unique nature of colored gemstones is one of the positive qualities that draws consumers to them. Thus, traditional jewelry retailing techniques tend to defeat the very essence that gives colored gemstones their appeal. Consolidation of mass merchandise retailers may exacerbate this problem.

BRIEF DESCRIPTION OF THE DRAWINGS

FIG. 6 illustrates an embodiment of a plurality of stone holders and a spacer according to some of the inventive principles of this patent disclosure.

FIG. 7 illustrates an embodiment of a plurality of stone holders and a spacer fastened according to some of the inventive principles of this patent disclosure.

FIG. 8 includes a cross sectional view of the stone holders and spacers of FIG. 7.

DETAILED DESCRIPTION

Figure 1:
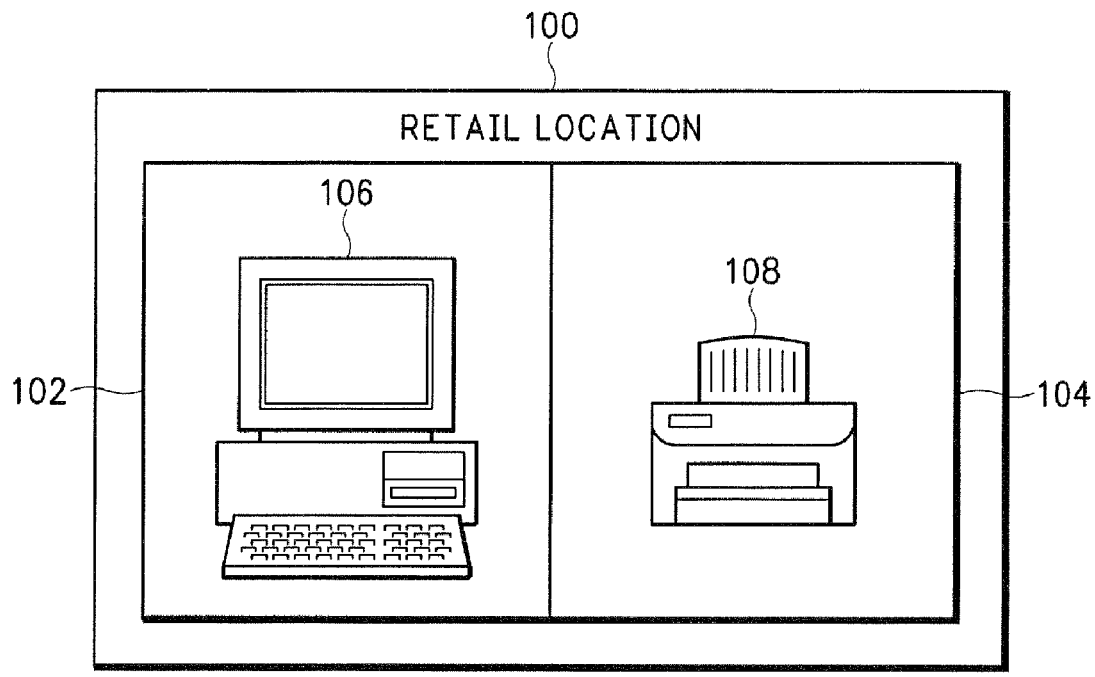
FIG. 1 illustrates an embodiment of a colored gemstone jewelry retailing system according to some of the inventive principles of this patent disclosure.

FIG. 1 illustrates an embodiment of a colored gemstone jewelry retailing system according to some of the inventive principles of this patent disclosure. The system of FIG. 1 includes a design center 102 located in a retail location 100 to design an article of jewelry having colored gemstones according to a consumer's input. The system also includes an imaging device 104 to image the article of jewelry for the consumer while the consumer is at the retail location. In this example, the design center is implemented with a computer workstation 106, while the imaging device is implemented as a color printer 108. The imaging device may be an integral part of the design center, or it may be a separate component. The workstation may also function as the imaging device if a hard copy image is not needed.

Figure 2:
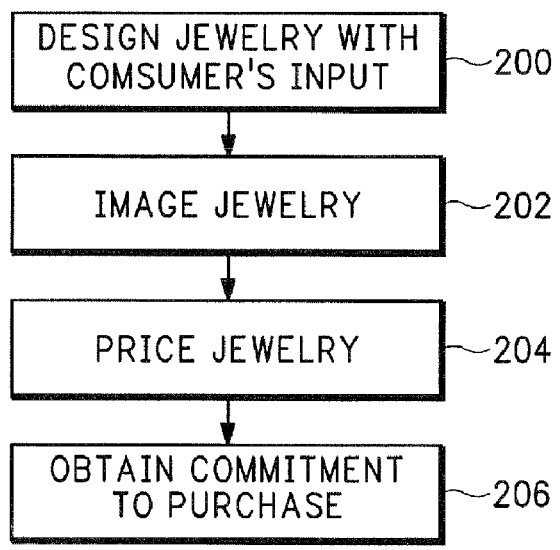
FIG. 2 illustrates an embodiment of a method of jewelry retailing according to some of the inventive principles of this patent disclosure.

FIG. 2 illustrates an embodiment of a method of jewelry retailing according to some of the inventive principles of this patent disclosure. This method may be implemented, for example, using the system of FIG. 1. Beginning at 200, an article of jewelry having colored gemstones is designed at a retail location according to a consumer's input. At 202, the article is imaged for the consumer while the consumer is still at the retail location. The article is priced at 204, and at 206 a commitment is obtained to purchase the article of jewelry. The sequence of steps may be rearranged, and some of the steps may be repeated until the consumer is satisfied with the design and a commitment to purchase is secured.

Figure 3:
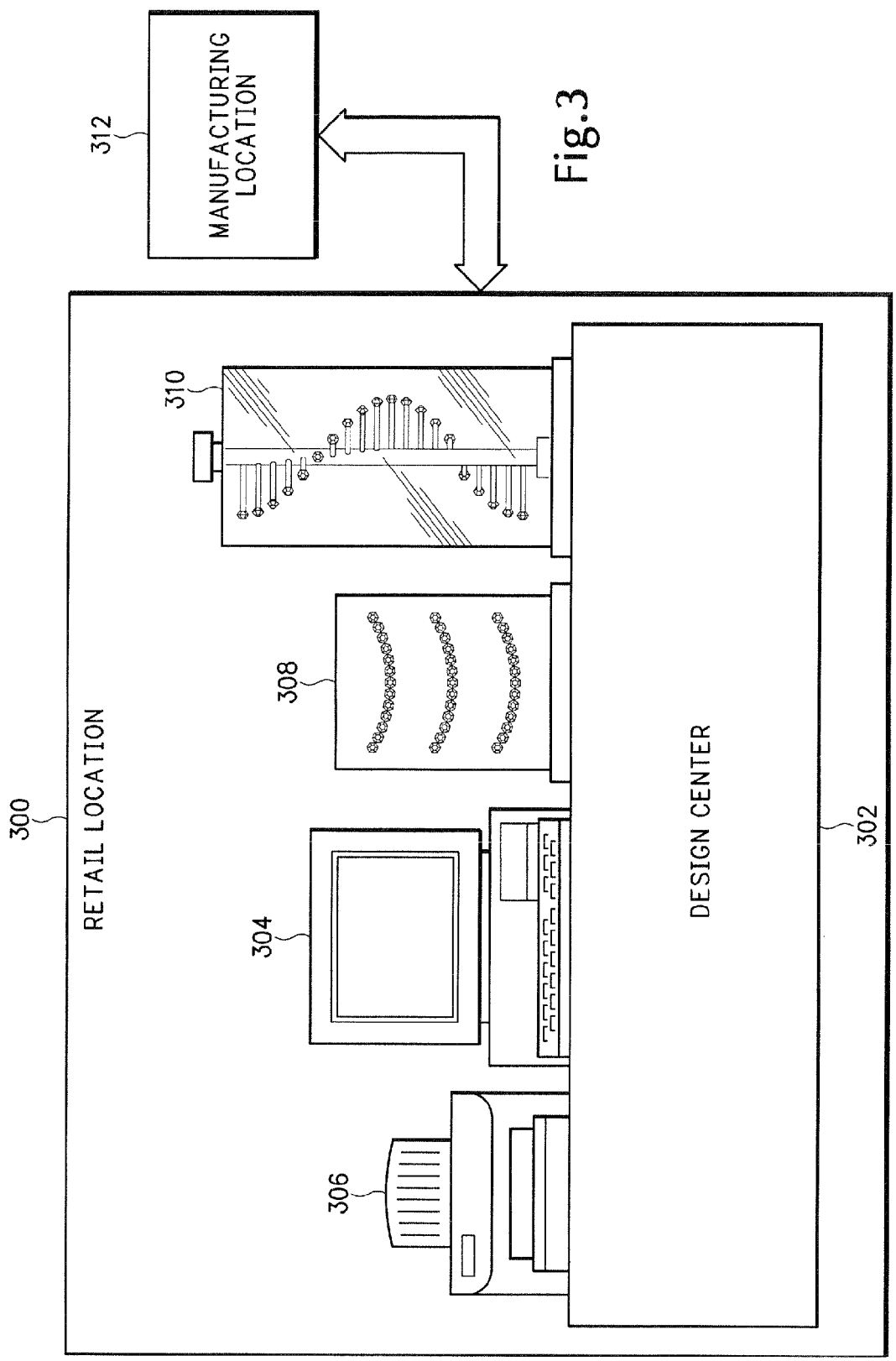
FIG. 3 illustrates another embodiment of a jewelry retailing system according to some of the inventive principles of this patent disclosure.

FIG. 3 illustrates another embodiment of a jewelry retailing system according to some of the inventive principles of this patent disclosure. The embodiment of FIG. 3 includes a retail location 300 having a design center 302 with a workstation 304 and a color printer 306. The workstation may be used to design an article of jewelry having colored gemstones according to a consumer's input, while the printer may be used to provide the consumer with an image of the article of jewelry. The design center also includes a display 308 having example jewelry designs, preferably with actual colored gemstones. A color exemplar display 310 illustrates many of the colors in which gemstones are available. The article of jewelry may be manufactured (or supplied) at a manufacturing (or supplier) location 312 that may be remote from the retail location, or alternatively, on the same premises as the retail location.

The inventive principles of this patent disclosure, some of which have been illustrated with respect to FIGS. 1-3, may enable a jewelry retailer to provide an innovative customer experience. An example of such an experience will now be described in the context of an independent retail jewelry store having a system to design a bracelet having multiple colored gemstones and customized based on input from a consumer, but the inventive principles are not limited to these particular details.

Referring again to FIG. 3, one of the first elements noticed by a consumer at the retail location may be the color exemplar display 310. Such a display may include numerous real or simulated colored gemstones, or pieces of brilliantly colored material of exaggerated size, that illustrate the multitude of colors in which gemstones are available. The exemplars may be arranged, for example, in a helical spectrum (like a rainbow spiral staircase) that a consumer can spin with a twist of a knob on top of the display, thereby creating an eye-catching spectacle that draws more consumers to the design center. This may be especially helpful in a crowded retail venue where recreational shoppers are attracted to stores that pop out from their surroundings.

The example jewelry display 308 may also attract attention. In this embodiment, it may include example bracelets illustrating some of the design variations that may be achieved by using the design center and emphasizing the brilliance of colored gemstones as a design element. For example, each bracelet may include a series of colored gemstones alternated with a series of spacers. The gemstones used in the example bracelets may be chosen to illustrate the various colors, shapes, sizes, mountings, etc., for each gemstone, while the spacers may be chosen to illustrate the various shapes, sizes, metals, etc., available.

The workstation 306, on which bracelets are designed, may be arranged in various configurations. For example, application software that designs the jewelry may reside on the workstation at the retail location. Alternatively, the application software may be located on a remote server, e.g., at the manufacturer's location, and accessed in the manner of a remote terminal, for example through a web browser.

The application software may be implemented with many different features and modes of operation according to the inventive principles of this patent disclosure. For example, it may allow a bracelet to be designed from scratch, in which case every element of the bracelet must be selected. Alternatively, the application software may provide an example jewelry design which may then be modified according to a consumer's input. For instance, the application software may begin with a design corresponding to one of the example bracelets from the example display 308, and then allow it to be modified according to the consumer's preferences.

The inventive principles of this patent disclosure allow for various amounts of involvement by both a consumer and a retailer. For example, the design center shown in FIG. 3 may be staffed by a customer service agent who performs essentially all of the detailed design tasks while a consumer watches the jewelry design materialize on a computer screen. The agent may continue to modify and display the design until the customer is satisfied with the result. Alternatively, the design center may be a complete self-service station. Between these extremes, various levels of support may be available. For example, online support may be made available through the workstation, customer service agents who, although not guiding the process, may be made available on request to lend assistance, etc.

To assure a high level of confidence in a consumer's ultimate satisfaction with the final jewelry design, the article of jewelry may be imaged at the retail location. In one embodiment, an image of the design may be displayed on an electronic display. To provide a more permanent image and preserve the consumer's memory of the design while the article of jewelry is being manufactured, a hard copy image may be provided to the consumer from the printer 304 which is preferably a high quality color printer.

Some of the inventive principles of this patent disclosure also provide numerous techniques for pricing an article of jewelry that has been designed according to a consumer's input. At the retail level, the final price of the article of jewelry maybe calculated manually by the retailer, or with the assistance of various tools that may be provided by the design center. For example, application software may automatically calculate a retail price using cost, pricing, and markup information input to the system by the retailer, manufacture, or both, etc. At the wholesale level, a price from the manufacturer to the retailer may be calculated by the application software using data supplied by the manufacturer, or the software may query the manufacturer for most recent pricing data.

Various techniques for obtaining a commitment to purchase the article of jewelry are also contemplated within some of the inventive principles of this patent disclosure. As with pricing, there are various parties to a commitment, e.g., a commitment from a consumer to purchase from the retailer, a commitment from the retailer to purchase from the manufacturer, or even a commitment from a consumer to purchase directly from the manufacturer, etc. In one embodiment, the commitment(s) may be obtained electronically through a workstation with the party or parties manifesting their commitment through any appropriate technique such as those used for online transactions. In such an embodiment, a commitment may be based on an image of the jewelry design provided on an electronic display so that, for example, a consumer can verify the design before committing to purchase.

Figure 4:
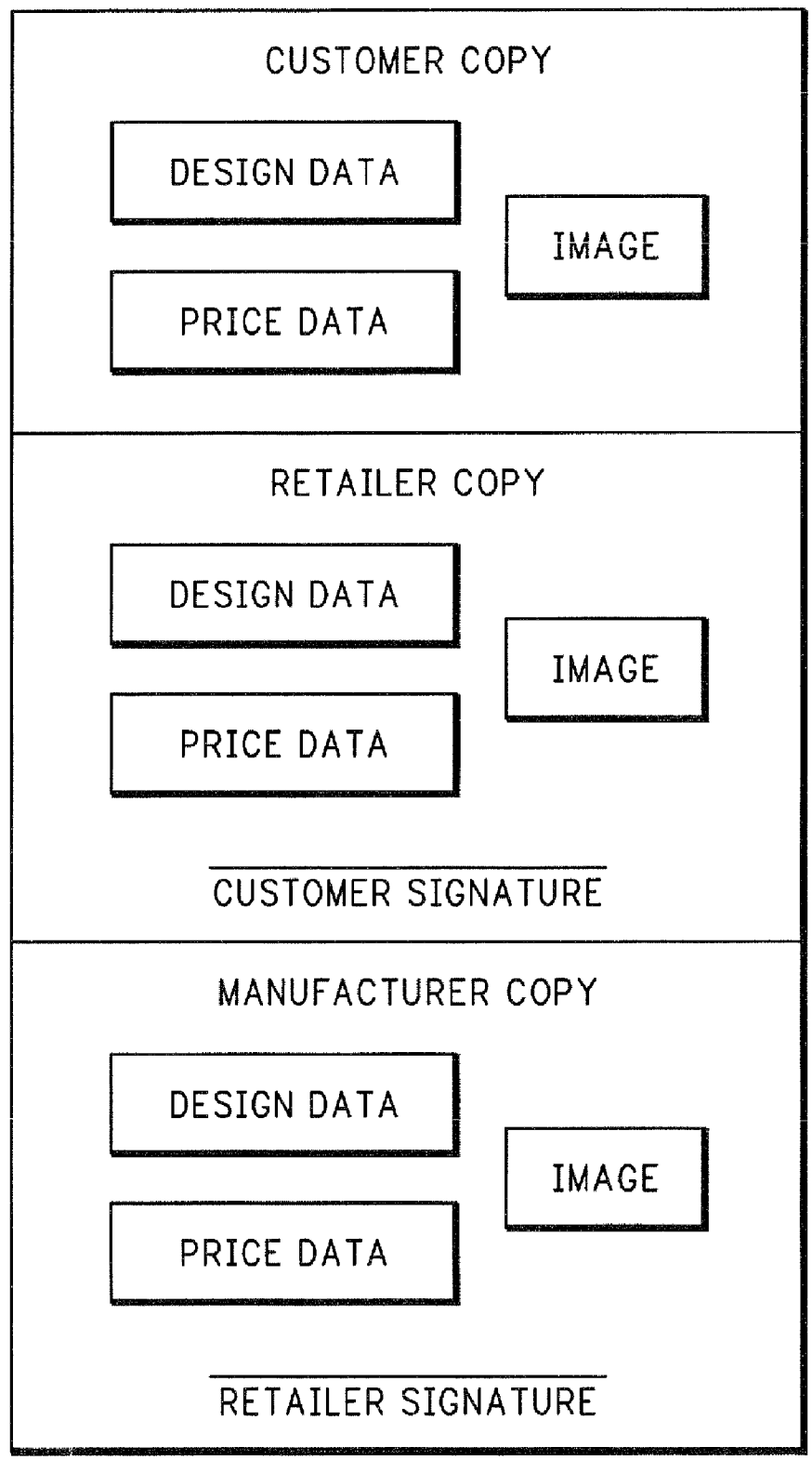
FIG. 4 illustrates an embodiment of an order form system according to some of the inventive principles of this patent disclosure.

In another embodiment, the commitment or commitments may be based on a multi-copy paper printout as shown in FIG. 4. In this embodiment, the consumer, retailer and manufacturer each receive a paper order form with design data, price data and an image of the jewelry design. The consumer signs the retailer's copy, and the retailer signs the manufacturer's copy. The Finn may be printed on the printer 304 at the design center. The retailer may present the customer copy directly to the consumer and forward the manufacturer's copy to the manufacturer. In one embodiment, the consumer may be given an attractively designed envelope, folder, etc, with a high resolution image of the jewelry design and any other supporting documentation such as the order form. The order forms may include more or less information such as a promised or estimated shipping date, estimated delivery date, location of delivery (retail location or consumer's home), etc.

Various methods of payment are also contemplated within some of the inventive principles of this patent disclosure. Prepayment using a credit card at time of commitment is one mode of payment that may be beneficial for all parties, especially if the design center is configured for self-service. Some independent jewelers, however, operate as credit retailers for the convenience of their customers. In such an arrangement, the retailer may provide immediate payment to the manufacturer while extending credit to its retail customers.

Figure 5:
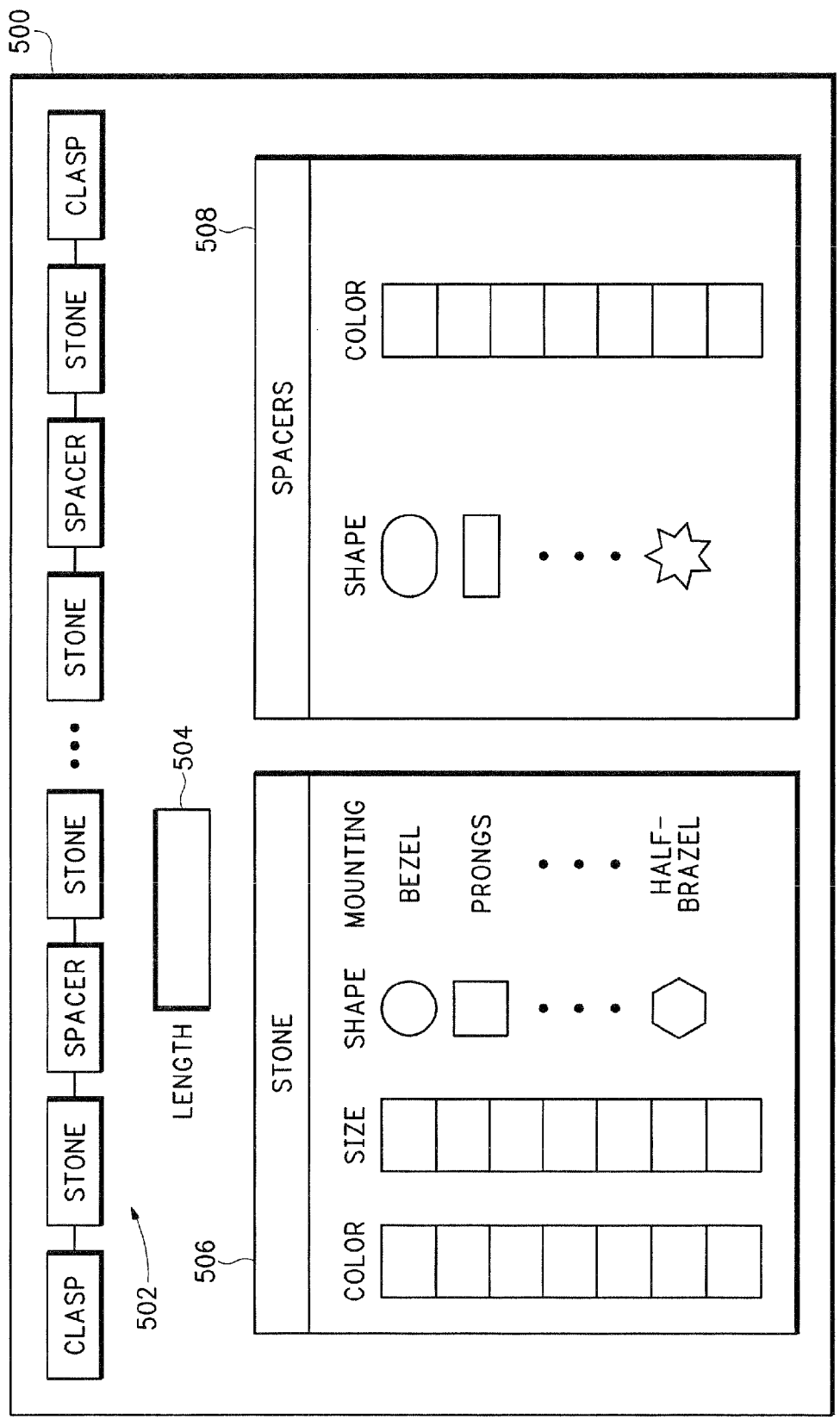
FIG. 5 illustrates an example screen shot of an embodiment of application software according to some of the inventive principles of this patent disclosure.

FIG. 5 illustrates an example screen shot 500 of an embodiment of application software according to some of the inventive principles of this patent disclosure. The software may begin the design process by providing a jewelry template, for example, an image of a bracelet 502 having blank spaces showing the location of gemstones and spacers to be selected. The designer, e.g., a consumer working alone, a consumer working with the assistance of a retailer, a retailer working under the direction of a consumer, etc, may optionally request that the application software pre-populate the template with details from an example design.

The designer may begin by selecting a bracelet length by clicking on a data entry box 504 and then typing the length. Alternatively, the application software may provide a pull down menu to select one of several predetermined lengths. Next, the designer may select any of the stones and spacers by clicking on one of the representative boxes to highlight a stone or spacer, and then using the stone selection menu 506 and/or the spacer selection menu 508. In this example, the stone selection menu may allow the designer to select color and size using slider bars and shape and mounting using icons. The spacer selection menu allows the designer to select shapes using icons and color using a slider bar. The screen may update the image of the bracelet each time a new stone or spacer is selected. Alternatively, the bracelet template may remain as a schematic template with a full-color image provided in a separate window or page.

The application software may provide additional screens and/or menus to enable display, calculation, etc. of pricing information, estimate of shipping time, entry of consumer information for payment/shipping purposes, close-up images of the design, menus for printing images of the design, order forms, confirmation pages, etc.

Some of the inventive principles of this patent disclosure also contemplate a pure online implementation in which a consumer's input is used to design an article of jewelry without involving a retail location. Such an embodiment may be implemented through application software residing on a processing unit controlled by a manufacturer and accessible through a web browser.

Although an online implementation may be advantageous in certain situations, an implementation involving a retail location may provide a more engaging customer experience. Recreational shoppers are increasingly interested in more enjoyable and entertaining shopping experiences. At the same time, consolidation of traditional retailers may result in more sterile and uniform shopping experiences, while television and online shopping forums may have an isolated feel. Embodiments of jewelry retailing experiences as described above and in accordance with the inventive principles may enable jewelry retailers to leverage their outstanding customer service skills and relationships by enabling custom jewelry designs in an engaging environment, even though the retailer may not have any actual jewelry design skills.

Additionally, techniques for imaging and obtaining purchase commitments according to some of the inventive principles of this patent disclosure may benefit all parties involved by preventing misunderstandings based on inaccurate perceptions of the final jewelry design, as well as assuring payment to both the retailer and the manufacturer.

Some of the inventive principles of this patent disclosure relate to fastening a stone holder with a spacer. FIG. 6 illustrates an embodiment of a plurality of stone holders and a spacer according to some of the inventive principles of this patent disclosure. FIG. 6 includes a stone holder 610 having an opening 616. The opening 616 may be shaped such that a precious or semiprecious stone is securely affixed in it. The shape of the opening 616 illustrated in FIG. 6 is exemplary in nature; any other appropriate shape is also possible.

The stone holder 610 may include two hooks 612 and 614 on the outside of its right wall and left wall, respectively. The hooks 612 and 614 may be used to securely fasten the stone holder to another stone holder or to a spacer.

FIG. 6 also includes a spacer 620 which may be fastened to the stone holder 610. The spacer 620 may include two opening on two sides. In the embodiment of FIG. 6, only the left side opening 624 is visible; the right side of the spacer 620 has a similar opening 622, although not visible in the figure. The openings 622 and 624 may be shaped such that one of the hooks 612 and 614 is securely fastened to one of the openings.

FIG. 6 also includes a second stone holder 630. The stone holder 630 may be similar to the stone holder 610; but unlike stone holder 610, the stone holder 630 has only one hook 632 on its outer right wall. The left wall of the stone holder 620 includes an opening 634. The opening 634 may be shaped such that the hook 612 is fastened to it. The opening 634, for example, may be similar to the openings 622 and 624. In one embodiment, the spacer 630 may be flipped (i.e., front side to the back and vice versa) while fastening it to another stone holder or a spacer such that the hook 632 appears on left wall and the opening 634 appears on the right wall.

FIG. 7 illustrates an embodiment of a plurality of stone holders and a spacer fastened according to some of the inventive principles of this patent disclosure. FIG. 8 includes a cross sectional view of the fastened stone holders and spacers of FIG. 7, FIGS. 7 and 8 include two stone holders 610, a spacer 620, and a third stone holder 630. The stone holders and the spacers may be securely fastened using the hooks and openings described with respect to FIG. 6. For example, referring to FIGS. 7 and 8, the right side hook 612 of the stone holder 610 on the extreme right is fastened to the left side opening 624 of the spacer 620. Similarly, the right side hook 612 of the stone holder 610 is fastened to the opening 634 of the stone holder 630. Several such stone holders and spacers may be fastened to create a necklace, a bracelet or any other appropriate piece of jewelry. In an embodiment, the stone holders or the spacers may be fastened to a chain to form a piece of jewelry. The order and combination of the stone holder and spacers of FIGS. 7 and 8 are exemplary in nature; different orders and combinations of stone holders and spacers are also possible. For example, only a plurality of stone holders 630 may be used, each stone holder 630 fastened to another. The hooks in FIG. 8 are shown with solder bridging the openings to secure the holders and spacers together, but other techniques for securing the holders and spacers may be used.

The inventive principles of this patent disclosure have been described above with reference to some specific example embodiments, but these embodiments can be modified in arrangement and detail without departing from the inventive concepts. For example, an imaging device such as a printer may be dedicated for use and located at the design station, or it may be a multi-purpose printer located elsewhere at the retail location. Some example embodiments have been shown using a bracelet as a jewelry example, but other types of jewelry having colored gemstones may be designed according to the inventive principles of this patent disclosure.

As a further example, a hybrid implementation may be realized in which a consumer participates online while designing an article of jewelry, but a jewelry retailer also participates, either online, by simultaneous telephone call, audio conference using voice over internet protocol (VoIP), etc. In such an implementation, the design and transaction may still be considered to occur at a retail location in the sense that a live retail customer service agent is still involved with assisting the consumer in real time as the jewelry is designed. Since the embodiments described above can be modified in arrangement and detail without departing from the inventive concepts, such changes and modifications are considered to fall within the scope of the following claims.

The invention claimed is:

1. A method comprising:
providing physical exemplars of colored gemstones in a moveable display at a retail location;
designing, at a workstation, an article of jewelry having colored gemstones according to a consumer's input at the retail location;
imaging, by an imaging device, the article of jewelry at the retail location; pricing the article of jewelry;
manufacturing the article of jewelry at a location separate from the retail location; and
obtaining a commitment to purchase the article of jewelry;
where obtaining a commitment includes obtaining the consumer's signature on a document with an image of the article of jewelry.

2. The method of claim 1 where designing the article of jewelry includes selecting one or more colored gemstones.

3. The method of claim 2 where designing the article of jewelry further includes:
selecting one or more spacers; and
arranging the spacers and gemstones.

4. The method of claim 2 where selecting one or more colored gemstones includes selecting a color, shape, size and/or mounting for each gemstone.

5. The method of claim 1 where imaging the article of jewelry includes providing a hard copy document having an image of the article of jewelry.

6. The method of claim 1 where imaging the article of jewelry includes providing an electronic image of the article of jewelry.

7. The method of claim 1 where obtaining a commitment includes obtaining payment from the consumer while the consumer is at the retail location.

8. The method of claim 1 further comprising providing example jewelry designs at the retail location.

9. The method of claim 8 further comprising enabling the example jewelry designs to be modified based on the consumer's input.

10. The method of claim 1 where pricing the article of jewelry includes pricing the article from a retailer to the consumer.

11. The method of claim 1 where obtaining a commitment includes obtaining a consumer's commitment to purchase the article of jewelry from a retailer.

12. The method of claim 11 where obtaining a commitment includes obtaining a retailer's commitment to purchase the article of jewelry from a manufacturer.

13. The method of claim 1 where the retail location is operated by an independent jeweler.

14. The method of claim 1 where the retail location comprises a jewelry boutique.

15. A system comprising a retail location including:
   a design center to design an article of jewelry having colored gemstones according to a consumer's input;
   an imaging device to image the article of jewelry for the consumer;
   a workstation at the retail location to design the article of jewelry, price the article of jewelry, and obtain the consumer's commitment to purchase the article of jewelry by obtaining the consumer's signature on a document with an image of the article of jewelry; and
   a manufacturing location separate from the retail location to manufacture the article of jewelry;
   wherein the design center includes physical exemplars of colored gemstones in a moveable display at the retail location.

* * * * *